United States Patent [19]
Gieseler et al.

[11] Patent Number: 5,139,350
[45] Date of Patent: Aug. 18, 1992

[54] THRUST FRICTION BEARING OF LAMINATE MATERIAL

[75] Inventors: Heinz Gieseler, Eltville/Rhein; Karl-Heinz Riehl, Rimbach/Odenwald; Ulrich Engel, Bad Schwalbach; Werner Lucchetti, Walluf; Michael Kubert, Klein-Winternheim, all of Fed. Rep. of Germany

[73] Assignee: Glyco AG, Wiesbaden, Fed. Rep. of Germany

[21] Appl. No.: 271,044

[22] Filed: Nov. 14, 1988

[30] Foreign Application Priority Data

Nov. 13, 1987 [DE] Fed. Rep. of Germany ....... 3738534
Oct. 15, 1988 [DE] Fed. Rep. of Germany ....... 3835175

[51] Int. Cl.⁵ ............................................. F16C 17/04
[52] U.S. Cl. .................... 384/420; 384/295; 384/903
[58] Field of Search ............... 384/420, 425, 295, 296, 384/903, 288; 29/149.5 DP, 149.5 R; 72/379

[56] References Cited

U.S. PATENT DOCUMENTS

| | | | |
|---|---|---|---|
| 515,089 | 2/1894 | McClelland | 384/425 X |
| 2,994,570 | 8/1961 | Cousino | 384/420 |
| 4,380,573 | 4/1983 | Näslund | 72/379 X |
| 4,604,786 | 8/1986 | Howie, Jr. | 72/379 X |
| 4,770,547 | 9/1988 | New | 384/420 X |

FOREIGN PATENT DOCUMENTS

0726897 9/1942 Fed. Rep. of Germany .
1625626 7/1970 Fed. Rep. of Germany .
2638996 3/1978 Fed. Rep. of Germany .

Primary Examiner—Daniel P. Stodola
Assistant Examiner—P. Bowen
Attorney, Agent, or Firm—H. Gibner Lehmann; K. Gibner Lehmann

[57] ABSTRACT

Thrust friction bearings with bent holding lugs wherein the holding lugs depressions are formed in the slide layer before the bending of the lugs. In one example, one shallow groove is stamped into an integral bracket forming a holding lug. In another example, several depressions are formed in rows, instead of grooves. The grooves or rows of depressions extend in a direction across the lug, preferably lying at an angle to the axis of curvature. Thus, when the holding lugs are formed by bending, damage to the slide bearing material will not occur.

18 Claims, 6 Drawing Sheets

THRUST FRICTION BEARING OF LAMINATE MATERIAL

BACKGROUND OF THE INVENTION

1. Field of the Invention

This invention relates to thrust friction bearings constituted of laminate material which has a substrate or carrier layer and a friction slide layer, and has at least one holding lug that is integrally formed and is bent substantially orthogonally to the slide layer surface. The invention also relates to methods for making such thrust slide bearings.

2. Description of the Related Art Including Information Disclosed under 37 CFR §§ 1.97–1.99.

For the locking of thrust friction bearings against rotation, particularly in automatic transmissions, holding lugs are used on the bearing elements. These may be disposed at the inside of a bearing washer, at the outside diameter thereof, or even within the bearing surface. Due to the high degree of bending and the considerable forces which are applied when shaping the holding lugs, peeling of and damage to the friction bearing material occurs, with fissuration or even detachment of friction material. If such a material particle becomes detached during operation of the bearing, the proper functioning of the entire group of components is imperiled. For this reason, holding lugs cannot be accepted as satisfactory on certain thrust friction bearings which have disadvantageous dimensions or material combinations.

From German Patent Publication 26 38 996 K-flange bearings are known, which are provided at the inner circumferences with the above-described holding lugs, bent in the direction of the bearing axis and braced against or locked to the bearing bore. Measures for preventing the material damage above referred to, however, are not indicated nor are they an object of this known invention.

From German Patent Publication 16 25 626 there are known collar friction bearings consisting of a metallic support body and running (slide) layers of plastic, where before the collar is pressed on, it is provided with axial slits for the formation of lobes or lugs. The lobes of the collar are not themselves machined additionally to prevent any material damage in bending.

German Patent 726,897 describes a method for making a collar-bearing shell half with a steel support or carrier shell and a slide-metal layer. Secured to the running or slide surface and to the collar is a flat steel strip having flanges, which latter are plated with a poured-on bronze layer. After the orthogonal bending of the flanges, the steel strip is then bent to a semicylindrical form. Before the bending of the flanges, the flange-bending areas are bordered on both sides at their edges by grooves extending in the longitudinal direction of the sheetmetal. Since the grooves do not lie in the bend region but instead in the flat portions of the bearing shell half and of the collar, a peeling or lifting-off of portions of the slide layer occurs in the bend region.

SUMMARY OF THE INVENTION

It is, therefore, one object of the present invention to provide improved measures at the holding lugs of thrust friction bearings so as to avoid peeling or other material damage of the slide layer during the shaping of the holding lug, and in particular during the bending thereof. Above all, the invention aims to prevent the possibility that material particles of the sliding layer could detach at the bend of the holding lug during operation of components involving the bearing.

According to the invention, this problem is solved in that, before the bending of the holding lug, some of the friction layer is displaced in the region where the bend is to be made in the lug, thereby to form depressed portions which extend at least into the bonding region between the slide layer and the carrier layer. Such depressed portions are then included in the bend and shaped with it during the bending step.

Due to the fact that these depressed portions are disposed in the region of the bend of the holding lug, wherein during the bending the greatest elongation occurs in the slide layer, there is effectively avoided any detachment of particles of the slide layer and all of the disadvantages connected therewith.

On the other hand, according to the invention, the slide layer, and hence the protective covering of the carrier layer which usually consists of steel, is still largely preserved in the region of the holding lug.

According to a preferred form of realization of the invention, a single groove can be provided as the said depression, said groove extending either parallel to or else at an angle alpha with respect to the camber axis of the bend.

The depressions in the slide layer can also be made in the form of a plurality of grooves arranged side by side and parallel to each other, and extending parallel to or at an angle alpha to the camber axis of the bend. The mutual spacing b of the grooves can be adapted to the thickness a of the sliding layer as follows:

$2a \leq b \leq 10a$, and preferably $3a \leq b \leq 6a$

The mutual spacing of the grooves can also be matched to the width c of the grooves in such a way that there remains between two adjacent grooves a web whose width e is between one and three times the width c of the grooves, namely between 0.5 mm. and 3 mm., preferably 1 mm.

In another form of realization of the invention, the depressions in the slide layer can be formed as a row of troughs arranged close together, the row of troughs extending parallel to or at an angle alpha to the camber axis of the bend. Also, by the provision of such troughs a tearing-open of the slide layer when bending the holding lugs can be effectively prevented.

The invention also provides a plurality of rows of troughs arranged side by side in the sliding layer, the rows of troughs extending parallel to each other and parallel to or at an angle alpha to the camber axis of the bend. Such troughs are preferably disposed to be as close together as possible. In this connection it has been found to be especially advantageous to arrange the troughs whereby they are offset with respect to each other in adjacent rows; that is, the troughs are staggered from row to row.

The troughs can be circular. The mutual spacing of the troughs from edge to edge of the trough should preferably be one to three times the diameter d of the troughs, namely between 0.5 and 3 mm., and preferably 1 mm.

According to the invention the troughs can also be made oblong, as in the form of rhombuses, triangles or crescents, with the longitudinal extent or dimension lying preferably in the direction of the trough row.

The mutual distance of the troughs from edge to edge is preferably up to three times the transverse extent of the troughs, up to 3 mm. as a maximum and preferably 1 mm.

The angle alpha at which the groove or grooves, or respectively the row or rows of troughs extend relative to the camber axis of the bend can be, by the invention, an acute angle, which is chosen preferably as follows:

$1.5° \leq alpha \leq 25°$, and preferably $3°$.

By the invention, the depressions, such as groove/-grooves and trough, are to be stamped into the slide layer, preferably with displacement of material, having a depth which depends on the thickness of the material. The depressions can be stamped to a depth which reaches into the bonding zone between the slide layer and the carrier layer, without extending up to or respectively into the carrier layer. But preferably the depressions, as grooves and troughs, should be stamped into the carrier layer, and preferably 0.1 mm. to 0.2 mm. deep into the carrier layer.

By the provision of the impressed groove or grooves, or troughs, the risk that the friction material might splinter, peel or chip off is eliminated to a large extent. It has been found that there must be at least one groove in the region of the greatest curvature to clearly reduce danger of detachment of bearing or slide material.

Further it has been found that, if there are several grooves, the spacing of the impressed grooves should not be less than twice the thickness of the bearing or slide material and not more than ten times the bearing material thickness. The best result is obtained at a groove distance or spacing of three times to six times the bearing material thickness. As tests have shown, an optimum groove spacing is about 1 mm.

An especially advantageous method, according to the invention, for producing such thrust friction bearings is had by a manufacturing procedure where the thrust friction bearing including the portion intended for the holding lug is made all in one piece and as a flat preform (blank) from a laminate material comprising a carrier layer and a slide layer; thereafter the holding lug portion of the flat preform (blank) is bent toward the side comprising the carrier layer, essentially at right angles to the slide surface. This method, according to the invention, provides that at the region of the preform (blank) which is intended for the bend but is as yet unbent and in the flat state, at least one depression is formed in the slide layer side, and then the portion forming the holding lug is bent toward the carrier layer side. In this process the bending of the holding lug can be effected without any risk of material splintering or peeling off. Even in the region of the bend of the holding lug the slide layer remains securely bonded to the carrier layer. As a result, there will be no subsequent chipping off of parts of the slide layer in the region of the bend. In particular there is no longer any danger that any splintering or crumbling of parts of the slide layer could occur in the region of this bend during use of the thrust friction bearing.

An especially advantageous variant of the method according to the invention, that can be carried out at favorable costs, provides that the preform (blank) is cut out of the laminate material by punching and the depression is simultaneously applied by stamping with displacement of material, whereupon the portion intended for the holding lug is bent. The punching, for cutting out the preform (blank), and the stamping of the depression can be performed in a single joint operation. It is possible also to perform the punching for cutting out the preform (blank) and the stamping of the depression separately in time, with a subsequent tool.

Other features and advantages will hereinafter appear.

BRIEF DESCRIPTION OF THE DRAWINGS

Embodiment examples of the invention are explained more specifically below with reference to the drawings, wherein.

DESCRIPTION OF THE PREFERRED EMBODIMENT

Figure 1:
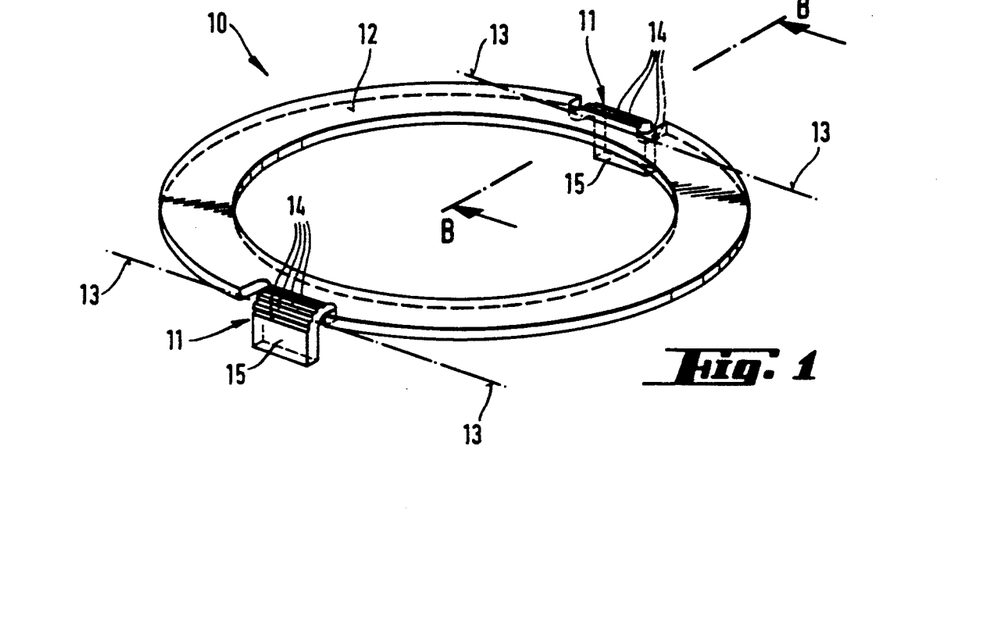
FIG. 1 is a plan view of an annular thrust friction bearing with two holding lugs disposed at the outer circumference; the side surface which is shown is the slide surface.
Figure 2:
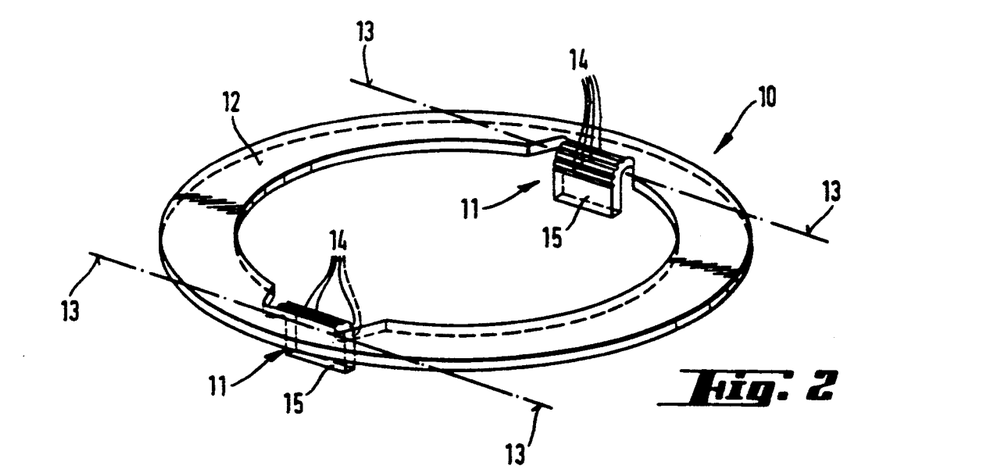
FIG. 2 is a plan view of an annular thrust friction bearing with holding lugs disposed at the inner circumference; the side surface which is shown is the slide surface.

In the annular thrust friction bearing 10 shown in FIG. 1, two diametrically opposite holding lugs 11 are provided at the outer circumference, which, prior to bending, lie in the same plane as the flat laminate material of the annular ring or washer 12. The holding lugs 11 are formed by bending the flat projecting portions or tabs 15 of the blank through 90°, toward the carrier layer side (away from the viewer). In the example of FIG. 2, an annular thrust friction bearing 10 has at the inner circumference of the bearing washer 12 two diametrically opposite holding lugs 11, which, too, have been formed by bending tabs or projections which at first lie in the plane of the washer. As FIGS. 1 and 2 show, the holding lugs 11 have shallow grooves 14 extending across the full width of the lugs and which, in the examples of FIGS. 1 and 2, extend parallel to the axis of curvature 13.

Figure 3:
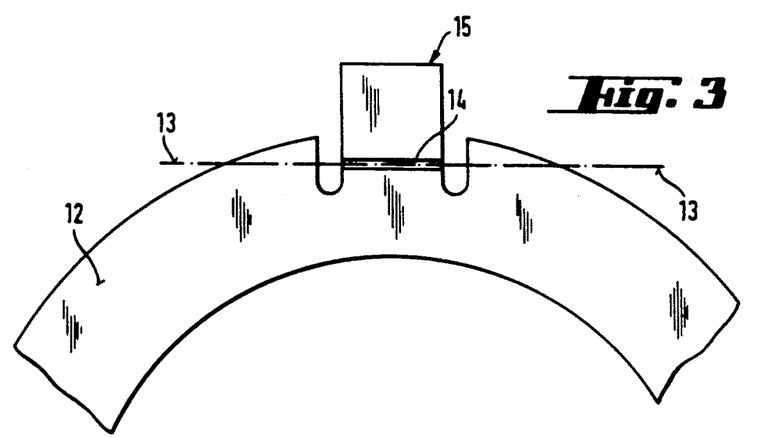
FIG. 3 is a detail of a flat blank (preform) for an annular thrust friction bearing with the flat bracket or lug portion ready to be bent 90° to form the holding lug.

In FIG. 3 there is shown a detail of a portion of a washer blank 12 for an annular thrust friction bearing, illustrating a tab 15 to be bent 90° for the formation of a holding lug. In this example a shallow groove 14 is disposed parallel to the axis of curvature 13 in the region of greatest elongation (stretch) of the slide layer. Instead of the groove 14, a row (series) of troughs (not shown in FIG. 3) can be provided.

Figure 4:
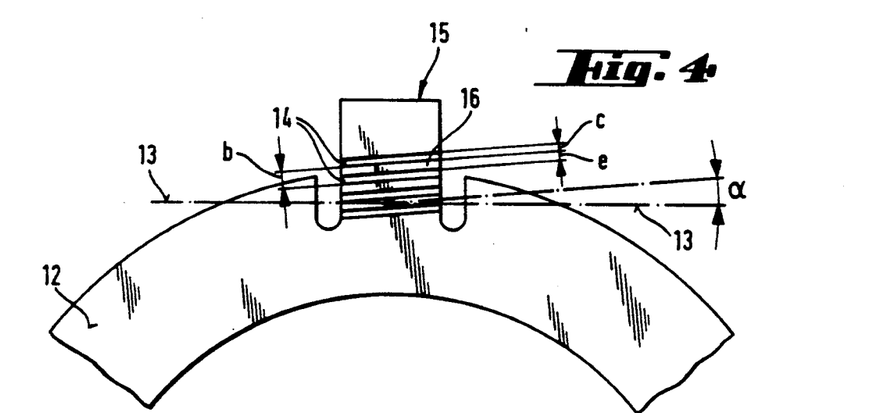
FIG. 4 is a view of a modification of the invention, in a representation similar to that of FIG. 3.
Figure 5:
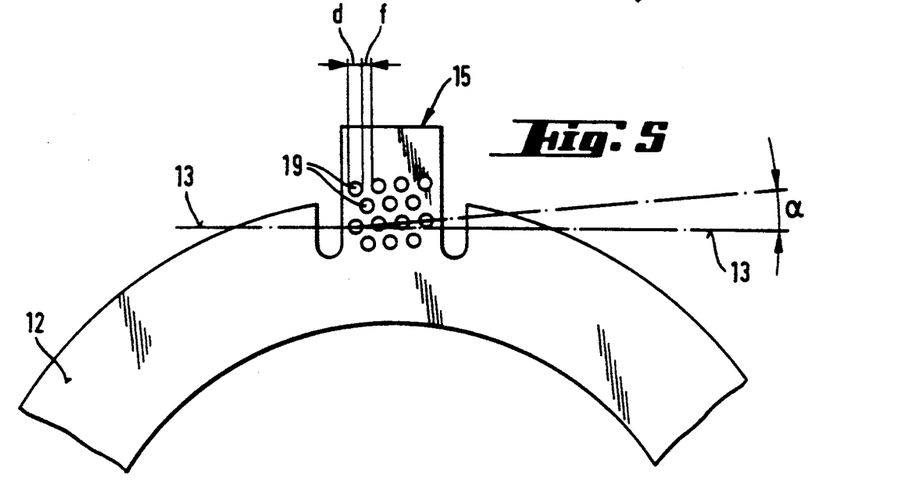
FIG. 5 is a further modification of the invention, in a representation similar to that of FIG. 3.

As has been found in tests, however, this groove or these grooves 14 will be still more effective if they extend at an acute angle alpha relative to the axis of curvature 13. As shown in FIGS. 4 and 5, when producing a flat blank for a thrust friction bearing 10 there must be formed firstly tabs or projections 15 lying in the plane of the washer 12, into which tabs according to FIGS. 4 and 5, grooves 14 or respectively troughs 19 are stamped. The grooves 14 or respectively the rows of troughs 19 extend at an angle with respect to the camber axis of curvature. For the angle alpha there applies the relation 1.5°≦alpha≦25°, preferably 2°≦alpha≦18°, the preferred angle alpha is 3°.

In the example of FIG. 4, the grooves 14 are formed so that they have a notch width of c, and between adjacent grooves 14 a web 16 remains whose width e from groove edge to groove edge is about one to three times the groove width c. Advantageously the web width e is about 0.5 to 3 mm., preferably approximately 1 mm.

The distance b between adjacent grooves 14, measured from center to center, is, in the example according to FIG. 4, matched to the thickness of the slide layer 17. For the groove spacing b relative to the thickness a of the slide layer 17 there applies:

$2a \leq b \leq 10a$, and preferably $3a \leq b \leq 6a$.

The optimum is a groove spacing b of about 1.5 to 3 mm.

In the example of FIG. 5, instead of grooves, rows of troughs 19 are stamped into the bracket 15 as depressions. As FIG. 5 shows, these trough rows extend along lines which run at an acute angle alpha to the camber axis of curvature 13. The impressed troughs 19 are staggered from row to row, i.e. the troughs 19 of one row are opposite the interstices between the troughs 19 of the adjacent row. In this way an almost uniform distance f to the next trough (in the same row or an adjacent row) is had all around the edge of a trough 19. The trough distance f should be between one to three times the trough diameter d, optimally about 0.5 to 3 mm., and preferably 1 mm.

Figure 6:
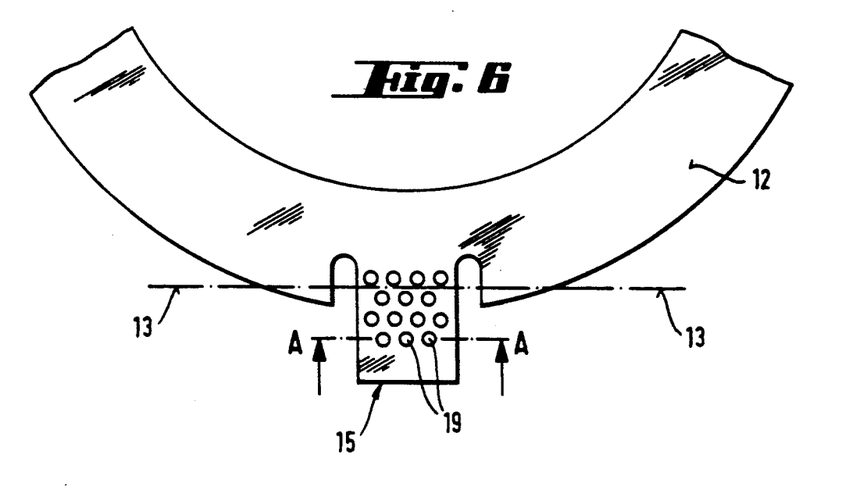
FIG. 6 is a fragmentary plan view of a half-ring-shaped detail of annular thrust friction bearing, illustrating another form of the invention.
Figure 7:
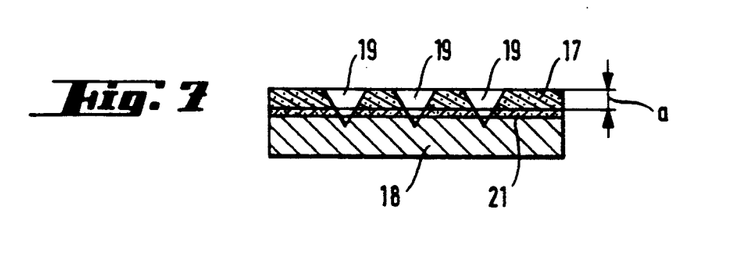
FIG. 7 is a section through the bearing along the line A—A in FIG. 6.
Figure 8:
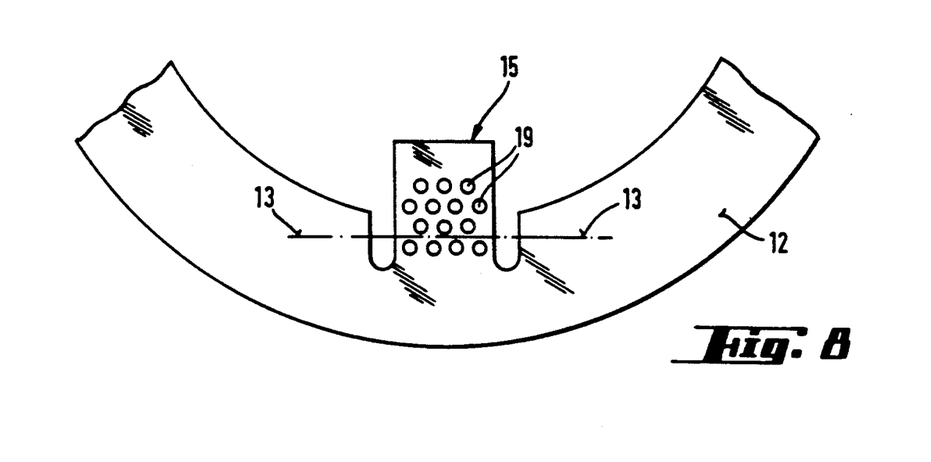
FIG. 8 is a fragmentary plan view of a further form of realization of the invention, in a representation similar to that of FIG. 6.

FIG. 6 shows a half-ring-shaped detail of the blank (preform) of a bearing washer 12, the troughs 19 in the tab 15 being arranged in parallel rows to the axis of curvature 13. As FIG. 7 shows, the troughs 19 are formed as conical depressions. FIG. 8 shows a tab 15 likewise provided with troughs 19, which tab is located at the inner circumference of the bearing washer 12.

Figure 9:
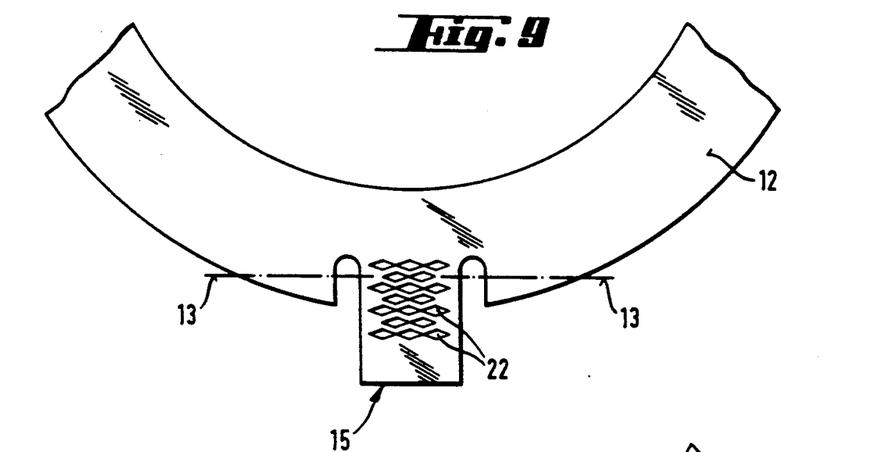
FIGS. 9, 10 and 11 are fragmentary plan views of further forms of realization of the invention, in representations similar to that of FIG. 6.
Figure 10:
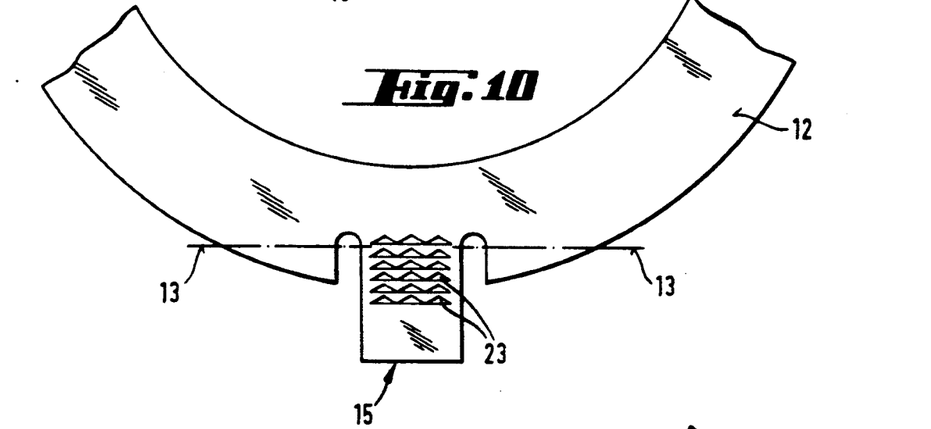

In FIG. 9, the depressions are formed as rhombuses 22, and in FIG. 10 as triangles 23.

Figure 11:
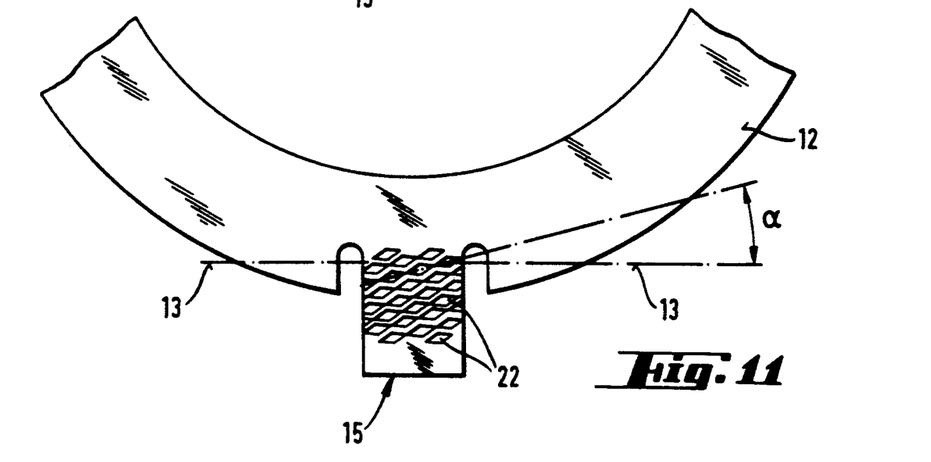

As shown in FIG. 11, the rhombuses 22 are arranged in rows which form, with the axis of curvature 13, the angle alpha.

Figure 12:
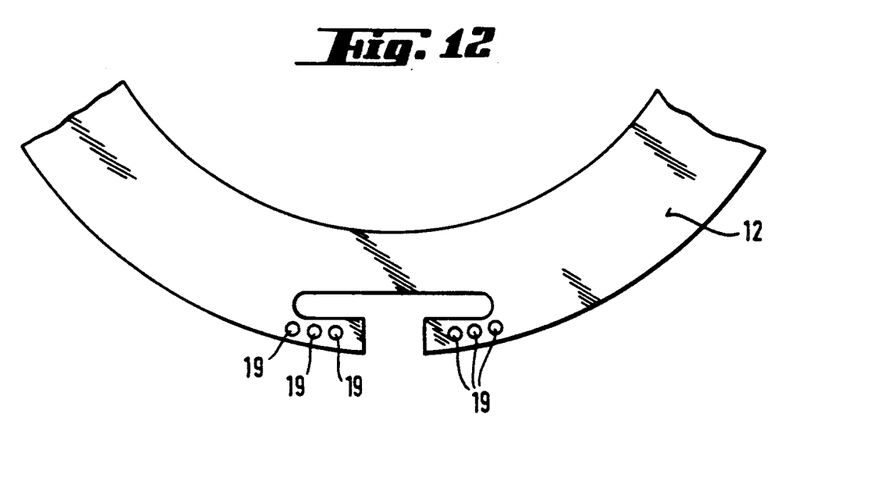
FIG. 12 is a fragmentary plan view of an annular thrust bearing according to the invention, having tangential brackets or lugs.
Figure 13:
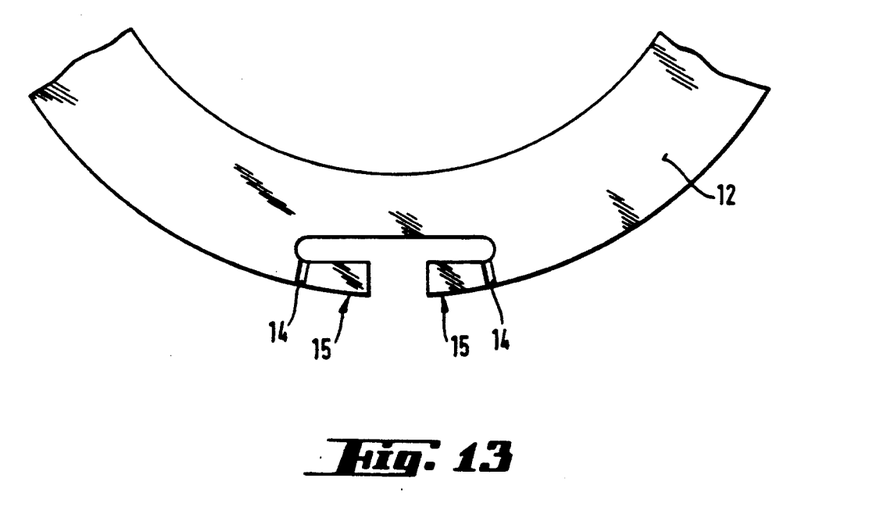
FIG. 13 is a fragmentary plan view of an annular thrust bearing having modified tangential brackets or lugs.

FIGS. 12 and 13 show blanks (preforms) of a bearing washer 12 with tangential tabs 15, into which again depressions are stamped. In the case of FIG. 12, these depressions are formed as troughs 19, and in the case of FIG. 13, as a groove 14 in each instance.

Figure 14:
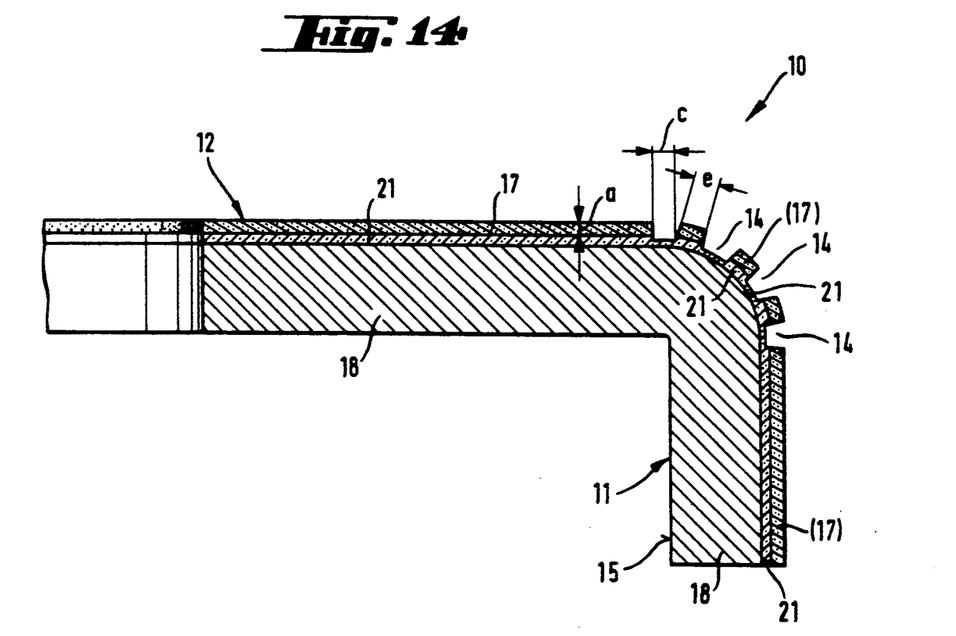
FIG. 14 is a section through a holding lug, along the line B—B of FIG. 1.
Figure 15:
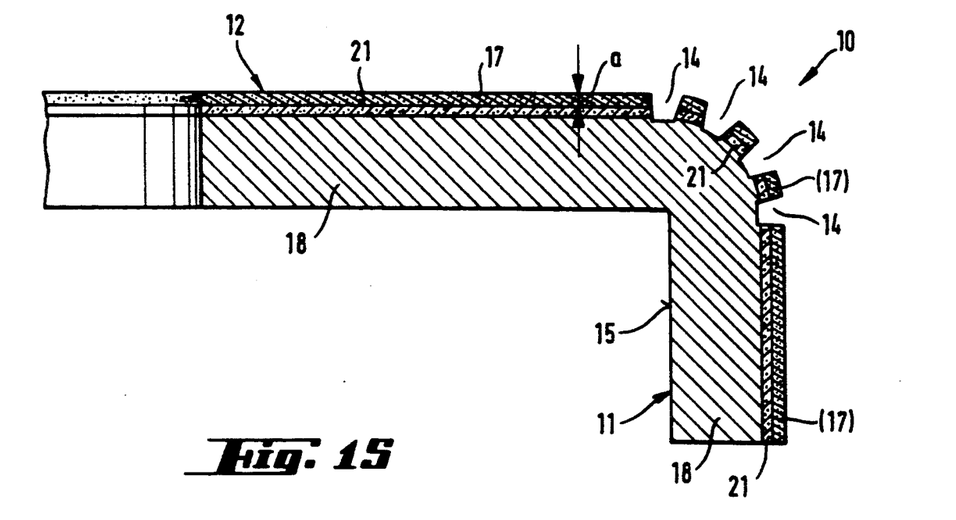
FIG. 15 is a section through the holding lug according to FIG. 14, but in a preferred form of realization of the invention.

In the illustrated examples the grooves 14 and the troughs 19 are formed by stamping in the slide layer 17, accompanied by a displacement of material. As FIG. 14 shows, the depth of the grooves 14 and correspondingly also the depth of the troughs 19 should extend at least into the bonding zone 21. However, it has been found that it is still more favorable to stamp the grooves 14 or respectively the troughs 19 still deeper, namely 0.1 to 0.2 mm. deep into the carrier layer 18 (see FIG. 15). As particularly illustrated in FIG. 14, there is formed in the bent region of the lug, a rounded surface at the free side of the slide layer, and there is also formed a rounded junction face between the slide layer and the bonding zone. There is further formed a second rounded junction face between the bonding zone and the carrier layer.

In all embodiments of the invention the depressions, be they grooves 14 or troughs 19, which are to be stamped are accompanied by displacement of material. As against forming the depressions by chip-removal machining, this offers not only price advantages, but above all also the assurance that no chips of material will form which could adhere to the workpiece. Lastly, by the stamping-in of the depressions, be they grooves 14 or troughs 19, an additional compaction or compression and flowing of material occurs and strengthening in the bonding region 21 between the slide layer 17 and the carrier layer 18 is brought about, so that also due to this the slide layer 17 has less tendency to detach from the carrier layer 18 during the bending, as compared with applying the depressions by chipping machining.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A thrust friction bearing constituted of a laminate member (12) which has a carrier layer (18) and a slide layer (17) and a bonding zone between said layers, said member having at least one integral bent holding lug (11) which is disposed after the layers have been bonded to each other, at an angle with respect to the slide layer, characterized in that said lug (11) has a depressed portion (14, 19) located intermediate the ends of the bend thereof and said depressed portion extending completely through the slide layer (17), and at least into the bonding zone between the slide layer (17) and the carrier layer (18), said depressed portion having a shape which is formed in part through displacement by compression and flowing of material, and in part by the bending of the lug (11).

2. A thrust friction bearing according to claim 1, wherein said lug has a camber axis (13), characterized in that said depressed portion constitutes a single groove (14) which extends parallel to the camber axis (13) of the bend of the lug.

3. A thrust friction bearing according to claim 1, wherein said lug has a camber axis (13), characterized in that said depressed portion comprises a plurality of grooves (14) formed in the slide layer (17) and arranged side by side parallel to each other and parallel to the camber axis (13) of the bend of the lug.

4. A thrust friction bearing according to claim 3, characterized in that the spacing (b) of the grooves from each other is commensurate with the thickness of the slide layer (17).

5. A thrust friction bearing according to claim 3, characterized in that the spacing of the grooves (14) from each other has the relation $2a \leq b \leq 10a$, where a is the thickness of the slide layer (17) and b is the groove spacing.

6. A thrust friction bearing according to claim 1, wherein said lug has a camber axis (13), characterized in that said depressed portion is constituted of a row of separate troughs (19) formed in the slide layer (17), said row of troughs extending parallel to the camber axis (13) of the bend of the lug.

7. A thrust friction bearing according to claim 6, characterized in that the troughs (19) are of circular configuration.

8. A thrust friction bearing according to claim 7, characterized in that the distance between the troughs (19) is at least equal to the trough diameter (d).

9. A thrust bearing according to claim 7, characterized in that the mutual distance between the troughs (19) is not greater than three times the diameter of a trough.

10. A thrust friction bearing according to claim 6, characterized in that the troughs (19) are oblong.

11. A thrust friction bearing according to claim 10, characterized in that the longitudinal dimension of the troughs (19) extends in the direction of the trough row.

12. A thrust friction bearing according to claim 10, characterized in that the distance (f) between the troughs (19) in the row is a small multiple of the transverse extent of a trough (19).

13. A thrust friction bearing according to claim 1, wherein said lug has a camber axis (13), characterized in that said depressed portion comprises rows of troughs (19) formed in the slide layer (17) and arranged side by side, said rows of troughs extending parallel to each other and to the camber axis (13) of the bend of the lug.

14. A thrust friction bearing according to claim 1, characterized in that the troughs (19) in adjacent rows are offset from each other.

15. A thrust friction bearing according to claim 1, wherein said lug has a camber axis (13), characterized in that said depressed portion constitutes a groove (14) which extends at an angle to the camber axis (13) of the bend of the lug.

16. A thrust friction bearing according to claim 1, wherein said lug has a camber axis (13), characterized in that said depressed portion is constituted of a row of separate troughs (19) formed in the slide layer (17), the said row of troughs (19) extending at an angle to the camber axis (13) of the bend of the lug.

17. A thrust friction bearing constituted of a laminate member (12) which has a carrier layer (18) and a slide layer (17) and a bonding zone (21) between said carrier layer and said slide layer, said member having at least one integral bent holding lug (11) which is disposed, after the layers have been bonded to each other at an angle with respect to the slide layer, there being formed in the bent region of the lug a rounded surface at the free side of the said slide layer and also formed a first rounded junction face between the said slide layer (17) and the said bonding zone (21), and further formed a second rounded junction face between the said bonding zone (21) and the said carrier layer (18), wherein said lug (11) has a depressed portion (14, 19) located within said bent region, said depressed portion (14, 19) extending through the said rounded surface at the free side of the said slide layer, through the said slide layer (17), through the said first rounded junction face and extending at least into the said bonding zone (21), said depressed portion being formed by displacement of material in both the slide layer and the bonding zone and said depressed portion having a shape which is formed in part by the bending of the lug (11).

18. A thrust friction bearing constituted of a laminate member (12) which has a carrier layer (18) and a slide layer (17) and a bonding region (21) between the said carrier layer (18) and said slide layer (17), said member having at least one integral bent holding lug (11) which is disposed, after the layers have been bonded to each other, at an angle with respect to the slide layer, there being formed in the bent region of the lug a rounded surface at the free side of the said slide layer (17) and also formed a first rounded junction face between the said slide layer and the said bonding region, and further formed a second rounded junction face between the said bonding region and the said carrier layer, wherein said lug (11) has a depressed portion (14, 19) located in the said bent region, said depressed portion extending through the said rounded surface at the free side of the slide layer (17), through the said slide layer (17), through the said first rounded junction face, through the said bonding region (21), and through the said second rounded junction face and extending into the said carrier layer (18), said depressed portion being formed by displacement of material in the said slide layer (17) and the said bonding region (21) and in the said carrier layer (18) and said depressed portion having a shape which is formed in part by the bending of the lug (11).

* * * * *